United States Patent [19]

Klauber et al.

[11] Patent Number: 5,144,846

[45] Date of Patent: Sep. 8, 1992

[54] MINIMAL STRUCTURE MAGNETOSTRICTIVE STRESS AND TORQUE SENSOR

[75] Inventors: Robert D. Klauber; Erik B. Vigmostad, both of Fairfield, Iowa

[73] Assignee: SensorTech, L.P., Fairfield, Iowa

[21] Appl. No.: 518,083

[22] Filed: May 2, 1990

Related U.S. Application Data

[63] Continuation-in-part of Ser. No. 222,838, Jul. 21, 1988, Pat. No. 4,939,937.

[51] Int. Cl.$^5$ ............................................. G01L 3/02
[52] U.S. Cl. ............................. 73/862.336; 73/DIG. 2
[58] Field of Search .............. 73/779, 862.36, DIG. 2, 73/862.69; 324/209

[56] References Cited

U.S. PATENT DOCUMENTS

| | | |
|---|---|---|
| 2,053,560 | 9/1936 | Janovsky . |
| 2,081,748 | 5/1937 | Janovsky . |
| 2,269,584 | 1/1942 | Eldredge . |
| 4,011,758 | 3/1977 | Reenstra et al. ............... 73/DIG. 2 |
| 4,414,856 | 11/1983 | Winterhoff ....................... 73/862.36 |
| 4,566,338 | 1/1986 | Fleming et al. ................. 73/862.36 |
| 4,590,807 | 5/1986 | Kobayashi et al. ............. 73/862.36 |
| 4,627,298 | 12/1986 | Sahashi et al. .................. 73/862.36 |
| 4,697,460 | 10/1987 | Sugiyama et al. .............. 73/862.36 |
| 4,750,371 | 6/1988 | Kobayashi et al. ............. 73/862.36 |
| 4,780,671 | 10/1988 | Hase et al. ...................... 73/DIG. 2 |
| 4,887,461 | 12/1989 | Sugimoto et al. .............. 73/118.1 |

FOREIGN PATENT DOCUMENTS

| | | | |
|---|---|---|---|
| 0184323 | 8/1987 | Japan | ................. 73/862.36 |
| 0298735 | 12/1987 | Japan | ................. 73/862.36 |

OTHER PUBLICATIONS

Fleming, W. J., SAE Paper #890482, "Magnetostrictive Torque Sensors–Derivation of Transducer Model" Feb. 1989.

*Primary Examiner*—Michael Razavi
*Assistant Examiner*—E. Shopbell
*Attorney, Agent, or Firm*—Bell, Seltzer, Park & Gibson

[57] ABSTRACT

A noncontacting method for sensing stress and torque based on the principle of magnetostriction comprises inducing a magnetic flux in a shaft (20) via such means as a single core/coil(58/60) placed close to the shaft (20) which detects torque by means of voltage or current changes in the coil (60). Another embodiment comprises two single core/coils (58/60 and 59/61) and signal processing circuitry which produces a signal minimally affected by material property inhomogeneities. An additional embodiment employs a plurality of sensors (66A/66B) strategically located around the shaft (20) to eliminate spurious signals which are due to bending stress and shaft misalignment.

6 Claims, 4 Drawing Sheets

MINIMAL STRUCTURE MAGNETOSTRICTIVE STRESS AND TORQUE SENSOR

CROSS REFERENCE TO RELATED APPLICATION

This application is a continuation-in-part of U.S. application Ser. No. 07/222,838 filed Jul. 21, 1988, now U.S. Pat. No. 4,939,937.

BACKGROUND OF THE INVENTION

1. Field of the Invention

This invention relates to a stress/torque sensor based on the principle of magnetostriction, and more particularly, to a simplified magnetostrictive stress/torque sensor which employs a minimal number of elements and hence is simpler and more economical than state of the art sensors.

2. Description of Prior Art

Engineers and scientists have sought a simple, reliable, accurate means for measuring torque in rotating shafts for well over a century. Applications for such a torque measuring apparatus include diagnosis, prognosis, and load level monitoring of a vast number of different types of rotary drive mechanisms such as automotive, ship, and plane engines; motors and generators of all types; oil drilling rigs; rotating machining tools; all electric power steering; robotics; and much more.

Further, measurement of mechanical power produced by an engine (or used by a generator) cannot be made without knowing both torque and rotational speed of the shaft. Hence there has heretofore been no ready means to determine on-line power and efficiency of rotary drive devices simply, accurately, and reliably. This has proven to be problematic in many areas of modern technology, but it has been particularly troublesome in attempts to develop modern automotive engine control systems which would improve fuel efficiency and optimize engine performance.

There are presently only four distinct methods for measuring torque directly in a rotating shaft. They are:
1. Twist angle of shaft measurement
2. Strain gauge sensor
3. Reaction force measurement
4. Magnetostrictive sensors The twist angle method involves measurement of the angle of twist of a shaft and correlates this, using the material and dimensional characteristics of the shaft, to torque. It entails a complicated and cumbersome mechanism with low sensitivity, calibration difficulties, and the necessity of using two different locations along the shaft. It invariably entails extensive engine modification, a costly endeavor.

The strain gauge approach requires bonding of strain guages to the shaft surface and relating strain measurement to torque. It is limited to low speed, is not amenable to mass production, lacks durability, and needs some means such as slip rings and brushes to bring the signal off of the shaft.

Reaction force measurement utilizes Newton's second law for rotational motion to relate force and motion of the engine mounts to shaft torque. The method must employ a large structure, has low sensitivity, is not feasible for production runs, and measures driveline, not engine, torque.

Magnetostrictive torque sensors take advantage of the magnetostrictive property of many ferromagnetic materials whereby tension stress typically increases (and compressive stress typically decreases) a given magnetic induction field (i.e., the "B" field) carried by the material. A coil of wire of arbitrary number of turns wrapped around an iron core is placed close to the shaft and an electric current passing through the wire causes a magnetic field to be induced in the rotating shaft. In magnetostrictive sensor designs such as those described in U.S. Pat. Nos. 4,590,807 and 4,627,298 and SAE paper #890482, a second coil of arbitrary number of turns is wrapped around the same iron core and used to measure the change in the induction (the B field) which results from the increased surface stress caused by the applied torque. Other magnetostrictive designs employ additional cores and/or coils in configurations differing from the aforementioned. These other designs are inherently more complex in nature, require additional elements, and for these reasons are not further discussed herein.

The magnetostrictive method described above has several advantages over the other three torque measuring methods, including
1) Non-contact: no slip rings
2) Not restricted to low speeds
3) Measures torque of engine directly
4) High sensitivity
5) Economical
6) Structural advantages, i.e., no strain gauge attachment problems, no large apparata
7) Only one location anywhere along shaft axis: little engine rework
8) Durable and reliable: no moving parts to cause mechanical failure, resistant to high pressure and temperature of engine environment
9) Readily miniaturized: can be made unobtrusive

OBJECTS AND ADVANTAGES OF THIS INVENTION

Accordingly, objects and advantages of this magnetostrictive torque sensor invention over prior art include considerable improvement in simplicity of design, lowered cost, and greater ease in manufacturing. This is accomplished by reducing the number of elements required in the sensor.

Other objects and advantages are elimination of signal variations due to bending stress, shaft misalignment, and tolerance variations; and minimization of material inhomogeneity induced errors.

Further objects and advantages of the invention will become apparent from a consideration of the drawings and ensuing description of it.

SUMMARY OF THE INVENTION

This magnetostrictive torque sensor invention accomplishes what prior art devices have done but uses fewer elements and hence is inherently simpler, less costly, and easier to manufacture.

Prior art devices employ an excitation coil wound around a ferromagnetic core to induce a magnetic field in a ferromagnetic, magnetostrictive shaft and a secondary pickup coil to measure changes in magnetic flux through the core. The core is typically aligned along a helix making a 45° angle with the shaft axis. (See FIG. 1.) Such alignment results in the magnetic induction field (the B field) being aligned along a direction of principal stress (tensile or compressive) when the shaft is torqued. The stress resulting from application of torque causes a change in the permeability along such directions due to the phenomenon of magnetostriction. Said change in permeability results in a change in the magnetic flux passing through the shaft and the core. The secondary pickup coil, via Faraday's law, produces a voltage which is proportional to that magnetic flux and hence dependent on the torque applied. The voltage of the secondary pickup coil is thereby used to indicate torque.

The present invention eliminates the need for a secondary pickup coil. In one embodiment, it utilizes a single coil at constant amplitude AC current to induce flux in a shaft. As torque is applied to the shaft, due to magnetostriction the voltage in the coil must change to maintain constant current amplitude in the coil. The voltage signal is a function of torque applied and hence it, or a function of it, is used to indicate torque.

In a second embodiment, constant voltage is used in the coil and current change related to torque change.

A third embodiment uses two sensors such as those of the previous embodiment to increase accuracy and eliminate spurious signal components from shaft permeability magnitude variation.

A fourth embodiment employs two or more magnetostrictive torque sensors such as those of embodiment one, two, or three and places said sensors strategically around the shaft such that a resultant signal produced by combining the signals of the individual sensors is free of erroneous signal components resulting from bending or misalignment of the shaft.

The invention, in its various embodiments, is thereby seen to function more directly and be inherently less complicated than prior art devices.

BRIEF DESCRIPTION OF THE DRAWINGS

Drawing Illustrating Prior Art

Drawings Illustrating the Present Invention

Figure 1:
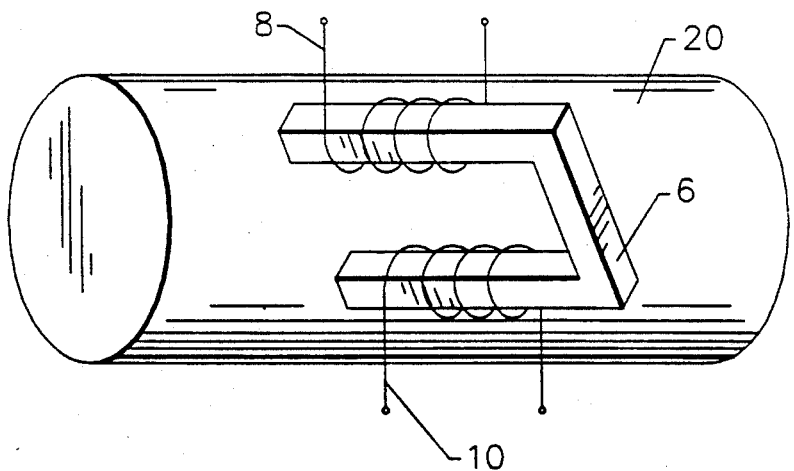
FIG. 1 depicts a typical prior art single core magnetostrictive torque sensor with both excitation and secondary pickup coils.
Figure 2:
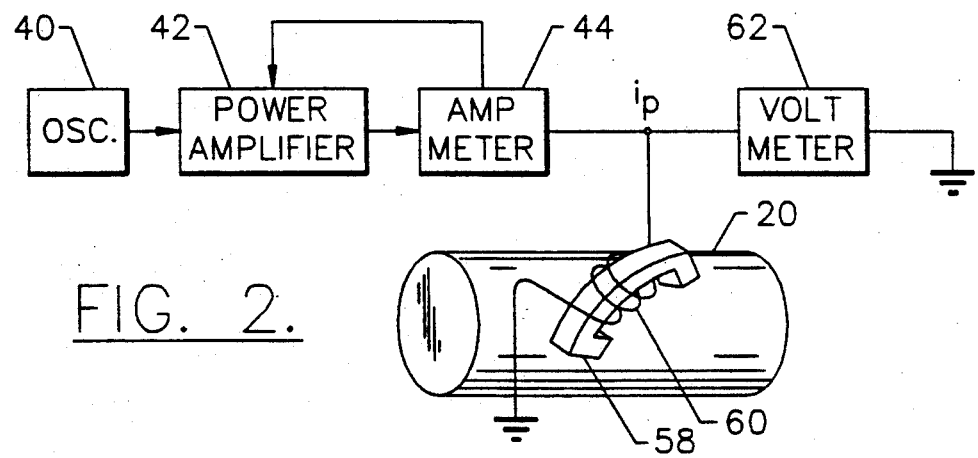

FIG. 2 shows embodiment number one of the present invention.

Figure 3:
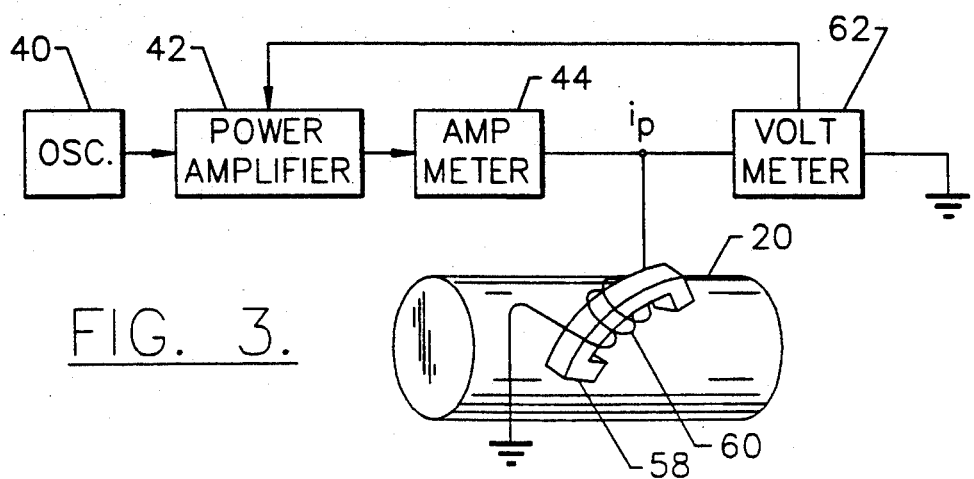

FIG. 3 shows one configuration of embodiment number two of the present invention.

Figure 4:
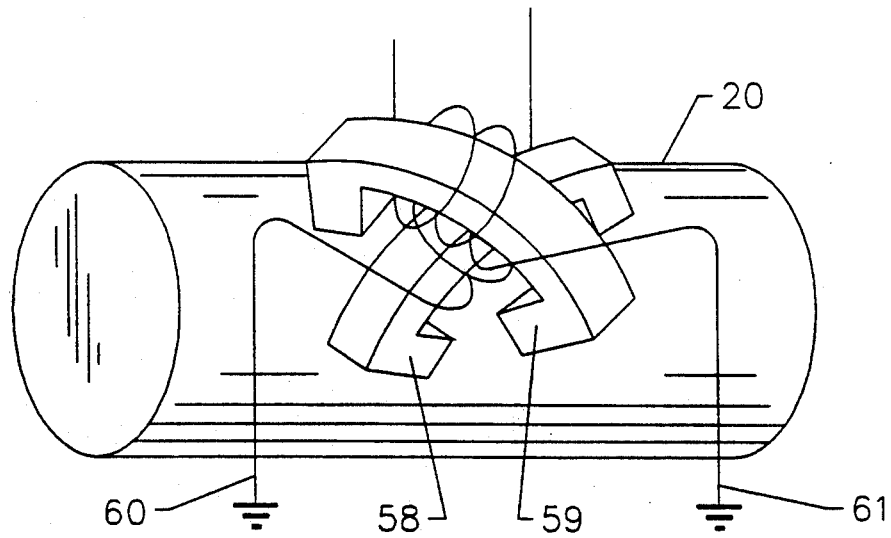

FIG. 4 shows embodiment number three of the present invention.

Figure 5:
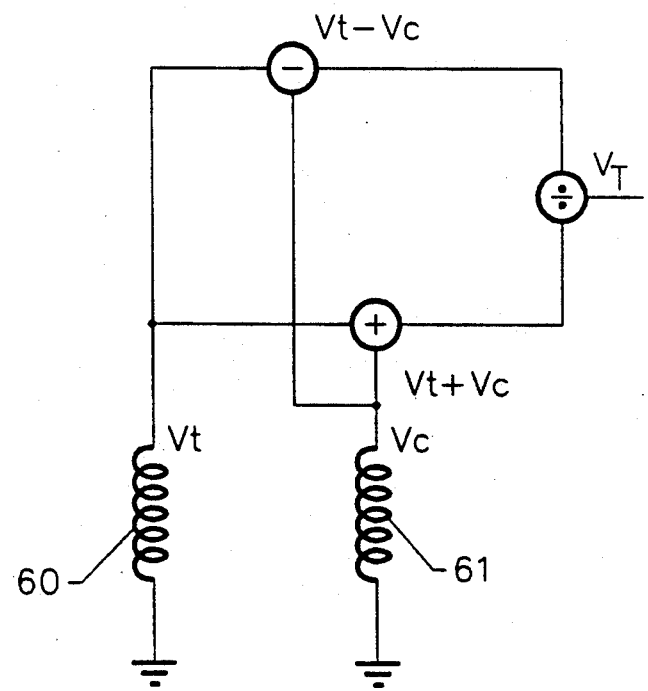

FIG. 5 shows the circuit diagram of embodiment number three.

Figure 6:
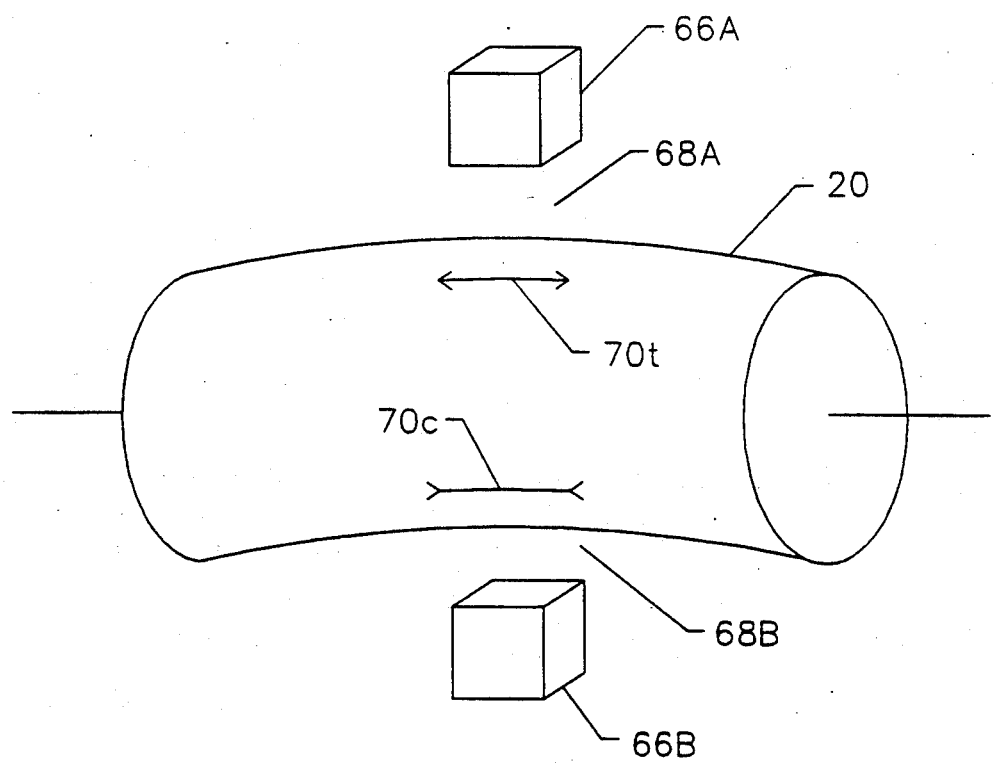
Figure 6:
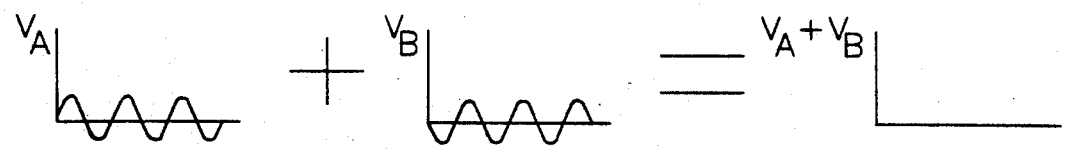

FIG. 6 depicts a fourth embodiment of the present invention, comprising a multiplicity of magnetostrictive torque sensors strategically located such that the sum of the voltages produced by each sensor is a signal which is effectively free of misalignment and bending stress induced signals.

Figure 7:
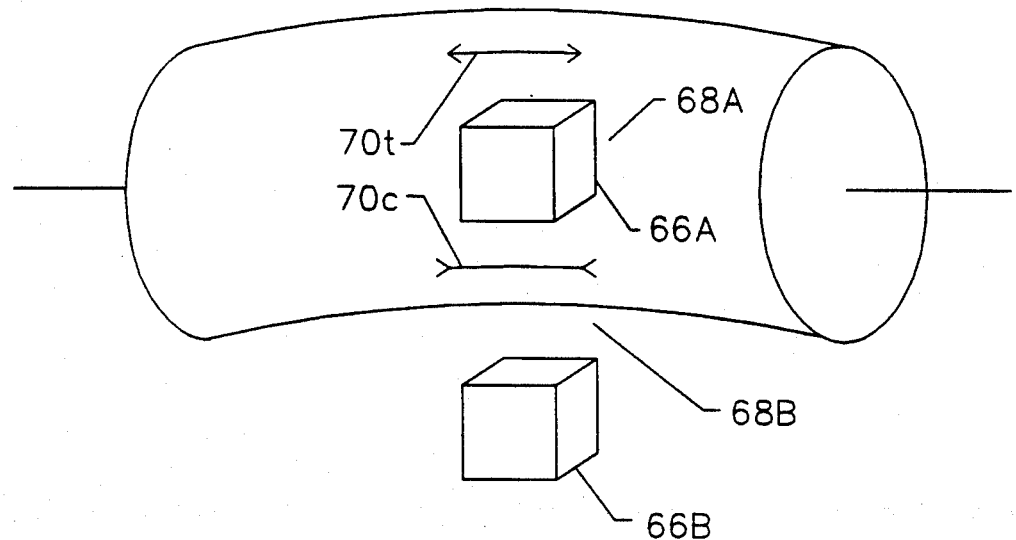
Figure 7:
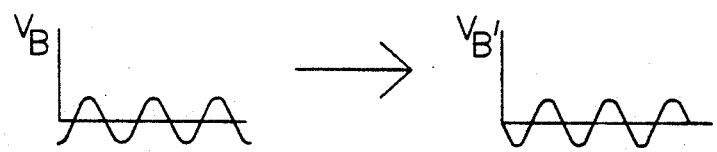
Figure 7:
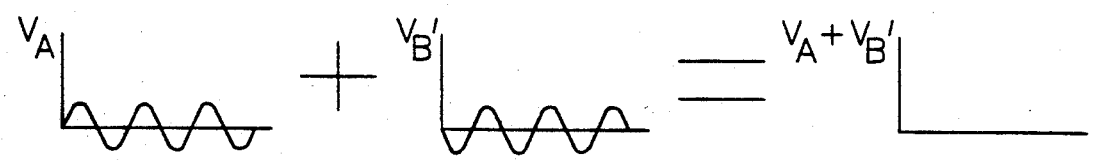

FIG. 7 depicts a different configuration of the fourth embodiment of the present invention, comprising a multiplicity of magnetostrictive torque sensors strategically located such that the sum of the phase shifted voltages produced by each sensor is a signal which is effectively free of misalignment and bending stress induced signals.

DRAWING REFERENCE NUMBERS 6 ferromagnetic core of prior art
8 excitation (driver) coil of prior art
10 secondary (pickup) coil of prior art
20 rotating shaft
40 oscillator
42 power amplifier
44 amp meter
56 signal divider
58 core
59 second core of embodiment three
60 coil
61 second coil of embodiment three
62 voltmeter
66A magnetostrictive sensor A
66B magnetostrictive sensor B
68A air gap between sensor A (item 66A) and shaft (item 20)
68B air gap between sensor B (item 66B) and shaft (item 20)
70c bending compressive stress
70t bending tensile stress

DETAILED DESCRIPTION OF THE INVENTION

Embodiment 1

FIG. 2 illustrates embodiment one in which a single coil of any number of turns is used to measure torque applied to a rotating or stationary shaft.

The core 58 and coil 60 of embodiment one are preferably aligned along a direction of principle stress in shaft 20, i.e., at a 45° angle to the main shaft axis. In FIG. 2 feedback from ammeter 44 to power amplifier 42 maintains constant amplitude current into coil 60. As torque is applied to shaft 20 stress on the shaft surface changes the magnitude of the induction field B induced on the shaft surface by the core/coil 58/60. For constant current amplitude the voltage across coil 60 measured by voltmeter 62 must then change and the change in voltage must be directly related to intensity of applied torque. With proper calibration, the readout of voltmeter 62 is a direct measure of applied torque.

Embodiment 2

FIG. 3 depicts another embodiment of the invention in which voltage across the coil 60 is kept at constant amplitude and current is allowed to vary. As torque is applied to the shaft, the flux passing through coil 60 changes and hence so does the current passing through the coil. The readout from ammeter 44 then varies directly with applied torque and can be used to measure torque applied to the shaft.

Although FIG. 3 shows a feedback of the voltage across the coil 60 wherein said voltage (shown by voltmeter 62) is maintained at constant amplitude, the invention also includes the simpler method of merely setting the voltage of the oscillator at constant amplitude. This latter method keeps the coil voltage approximately constant, and current sensed by ammeter 44 will then be an approximate measure of torque in the shaft. Under some conditions said approximate measure of torque can be sufficiently accurate enough for practical application.

The coil/core 58/60 of the invention in the aforementioned and any other embodiments ideally can be aligned along either of the directions coincident with the principle stresses. Alternatively, the coil/core can be aligned in any direction relative to the shaft axis and a meaningful (though not necessarily optimum) signal can be obtained.

Although the invention is described herein with reference to voltage across and current in the coil, those skilled in the art will recognize that other circuit parameters, such as voltage or current in other parts of the circuit, are also dependent on magnetostrictively produced changes in permeability of the shaft and hence can be used to determine torque. Also, other means such as bridge circuits can be used to indicate current or voltage changes in the coil. The invention in the aforementioned and any other embodiments therefore also relates to uses of other such circuit parameters and/or other such circuits to determine torque. For example, use of any method, device, or circuit which measures impedance of the coil directly or indirectly is also our invention. Our invention comprises any method or means wherein an excitation coil used to produce a magnetic induction field is also used to determine the change in permeability of a stress carrying element.

Embodiment 3

FIG. 4 depicts embodiment three comprising an enhancement of the single coil/core devices of FIG. 2 whereby a second single coil/core 59/61 (preferably, but not necessarily) is aligned at right angles to single core/coil 58/60, i.e., along the direction of the second principle stress. A meaningful measure of torque would then be the signal resulting from subtraction of the voltage signal from one of the single coils from the voltage signal of the other single coil, e.g., $v_l - v_c$. If this signal were free of inhomogeneity caused spurious signals it could be used directly as an effective indicator of torque. If such inhomogeneity caused spurious signals were present, however, this signal could be divided by $v_l + v_c$ to obtain a resultant signal $v_T$ which would be minimally affected by such spurious signals. Division of two signals dependent in the same manner on shaft properties results in a signal which is independent of the shaft properties. A signal processor block diagram accomplishing this is depicted in FIG. 5.

Embodiment three has the advantage that zero output signal $v_T$ would correspond to zero torque and hence, for example, a twofold increase in torque would result in a twofold increase in output signal $v_T$. In the single coil version on the other hand, a large nonzero output signal would be measured by voltmeter 62 even when no torque is applied. Doubling of torque from any given value would result in only a small percentage increase in output signal and hence accuracy in the single coil version would not be as good as that of embodiment three.

Although the discussion of embodiment three as depicted in FIGS. 4 and 5 relates to changes in voltage for constant amplitude current, embodiment three equally as well relates to changes in current for constant amplitude voltage. Further, the single core/coil 58/60 can be at any angle with respect to the shaft and the secondary core/coil 59/61 can be at any nonzero angle with respect to single core/coil 58/60.

Embodiment 4

FIG. 6 illustrates embodiment four which eliminates spurious output signal caused by shaft bending stresses and/or shaft misalignment and which is applicable to any of embodiments one through three as well as to prior art.

The inductance L is dependent on the air gap dimension. For shaft displacement from centerline due to slight misalignment or bending, the inductance L will change and hence so will the output signal. In addition, stresses from bending will affect permeability (magnetostriction again) and further alter the output. Both of these effects contribute erroneous components to the output signal which are sinusoidal with period equal to the time of one shaft revolution.

This problem can be ameliorated in two ways:
1) Place sensor in an end or main bearing where no bending stress exists and misalignment can be minimized. (The invention and any of its embodiments described herein can be used in any location along a shaft including the end or main bearing. The reader will understand that a specific location cannot be claimed as a patent right.)
2) Use two sensors 66A and 66B on opposite sides of the shaft as in FIG. 6 and add the two (instantaneous) signals $v_A$ and $v_B$. For simplicity FIG. 6 is shown with zero applied torque although the method is applicable with torque of any magnitude.

Method 2) above works because the misalignment and bending stress signal aberrations are 180° out of phase and so cancel one another when added. This second method has the added advantage of doubling effective signal strength (i.e., the sensitivity).

Method 2) functions optimally when sensors 66A and 66B are on opposite sides of the shaft. The sensors can, however, have any angular relation to one another as long as proper phase corrections are made to one or both signals to correct for the variation from 180° angular spacing between sensors. (See FIG. 7 for one such configuration.) Further, embodiment four relates to any orientation of the sensors which is sufficiently close to 180° angular separation such that the sensor signals can be added directly without phase shifting to achieve a sufficiently accurate signal.

While the discussion of embodiment four relates to a single pair of sensors, any number of pairs may be employed. Alternatively, a group of more than two sensors could be used in which signals from all sensors are added to obtain a resultant signal free of misalignment and bending stress induced components. For example, signals from three sensors spaced 120° apart, or sufficiently close to 120°, could be directly summed. For spacing other than 120°, signal phase shifting can be done where necessary before summation.

Embodiment four has the added advantage of being amenable to mass production because it solves the misalignment and bending stress problems in a manner which is independent of individual shaft bending or misalignment. Changes in alignment and bending stress over time will also automatically be accounted for.

ADVANTAGES OVER PRIOR ART

Our invention can thus be seen to accomplish what prior art devices do and more, but our invention is simpler, more economic, more straightforward, and easier to manufacture than any previous art.

While the above description contains many specificities, the reader should not construe these as limitations on the scope of the invention, but merely as exemplifications of preferred embodiments thereof. Those skilled in the art will envision many other possibilities that are within its scope. For example any of the embodiments can use any materials, including superconductors, for any components, and can have any dimensions or shapes. The air gaps can be of any dimensions and can even be of non-constant or non-uniform gap width. The shaft 20 can be rotating or stationary and of any suitable material, size, or shape. The shaft does not even have to be cylindrical and can have one or more strips of material attached to it which enhance the working of the invention. The strips can be of any suitable material including thin films and can be attached to any amount of the shaft. Further, the shaft or any attachments to it may be treated to minimize random anisotropy effects. Such treatments include, but are not limited to, vibration shaking, scoring of the surface, knurling, grinding, mechanical or laser scribing, shot peening, sand blasting, heat treatments, torsional or axial overstraining, rolling, chemical treatments, and electromechanical treatments. Also, it is not necessary that the torque be transmitted through a shaft and any torque transmitting element may be used.

In any embodiment where one or more coils are used, any number of coil windings can be used for any of the coils in any of the embodiments, and the cores can have any suitable shape and size as well as be of any suitable material. The cores do not have to be ferromagnetic and can, if for instance the wires are superconducting, be made of air, any gas, any other material, or even a vacuum. Additionally, wherever one coil is indicated a plurality of coils could be employed. Also, whereas AC sinusoidal current is probably the most suitable for the invention, any wave form current/voltage can be used, even DC or a pulse with appropriate integration/differentiation. Wherever constant amplitude of any signal is referred to, any nearly constant amplitude signal which results in an acceptable measure of torque will suffice. Further, any signal does not have to be used directly but can be amplified or transformed in any manner and the resultant amplified or transformed signal can be used for the same or similar purpose as the original signal. Also, any signal (e.g. voltage) does not have to be measured directly, but can be determined indirectly via measurement of parameters which are related to such a signal (e.g.'s, measuring other voltages in a loop, measuring current when impedance is known, etc.) Such indirect measurement includes use of bridge circuits or any means which indicate coil voltage change or coil current change. Of course, all arrangements where voltmeters with one side attached to ground measuring the non-grounded side of a circuit can equivalently be arranged where the same voltmeters measure voltage across the circuit with neither side grounded. The converse is true as well. Although the terms voltmeter and ammeter are used, any means to measure or determine voltage and amperage can be employed; and although terms such as oscillator and power amplifier are used, any devices which serve the same or similar purposes for them or any other system components can be employed as well. Further, the sensors can be located anywhere along the shaft axially, radially, or at the ends, in any number, and can even be used with a torque disk such as that described in U.S. Pat. No. 4,697,460 or other such appendage to the shaft. Also, any of the embodiments can be used separately or in combination in any degree with any of the others.

Finally, the invention in any of its embodiments can also be used as a device to measure stress and strain, and can even be used to measure force applied to any given object or objects. Accordingly, the scope of the invention should be determined not by the embodiments illustrated, but by the appended claims and their legal equivalents.

We claim:

1. Apparatus for sensing torque in a torque transmitting member, consisting of:
   an electrically conductive coil for inducing a magnetic induction field flux in the torque transmitting member when said coil is energized;
   means for supplying constant current through said coil to energize said coil; and
   means for sensing the voltage across said coil which is produced by the constant current energization of said coil, to thereby determine torque in the torque transmitting member.

2. The torque sensing apparatus of claim 1 wherein said constant current supplying means supplies a constant alternating current to said coil.

3. A torque sensing method of the steps of:
   providing an electrically conductive coil for inducing a magnetic induction field flux in a torque transmitting member when said coil is energized;
   supplying constant current through said coil to energize said coil; and
   sensing the voltage across said coil produced by the constant current energization of said coil, to thereby determine torque in the torque transmitting member.

4. The torque sensing method of claim 3 wherein said constant current supplying step a constant alternating current to said coil.

5. Apparatus for sensing stress in a member, consisting of:
   an electrically conductive coil for inducing a magnetic induction field flux in the member when said coil is energized;
   means for supplying constant current through said coil to energize said coil; and
   means for sensing the voltage across said coil which is produced by the constant current energization of said coil, to thereby determine stress in the member.

6. A stress sensing method consisting of the steps of:
   providing an electrically conductive coil for inducing a magnetic induction field flux in a member when said coil is energized;
   supplying constant current through said coil to energize said coil; and
   sensing the voltage across said coil produced by the constant current energization of said coil, to thereby determine stress in the member.

* * * * *

UNITED STATES PATENT AND TRADEMARK OFFICE
CERTIFICATE OF CORRECTION

PATENT NO. : 5,144,846
DATED : September 8, 1992
INVENTOR(S) : Klauber et al.

It is certified that error appears in the above-identified patent and that said Letters Patent is hereby corrected as shown below:

Column 8, line 23, after "method" please insert --consisting--.

Column 8, line 35, after "step" please insert --supplies--.

Signed and Sealed this

Fourteenth Day of September, 1993

Attest:

Attesting Officer

BRUCE LEHMAN

Commissioner of Patents and Trademarks